United States Patent

Isherwood

[11] 4,110,627
[45] Aug. 29, 1978

[54] DETECTING LATERAL POSITION OF WEBS
[75] Inventor: Jeffrey Isherwood, Enfield, England
[73] Assignee: Crosfield Electronics Limited, United Kingdom
[21] Appl. No.: 782,830
[22] Filed: Mar. 30, 1977
[30] Foreign Application Priority Data
   Apr. 1, 1976 [GB] United Kingdom ............... 13285/76
[51] Int. Cl.² ........................................... G01N 21/30
[52] U.S. Cl. .................................. 250/561; 250/548; 250/560
[58] Field of Search ......................... 250/548, 560, 561
[56] References Cited
   U.S. PATENT DOCUMENTS
   2,220,736  11/1940  Stockbarger et al. ........... 250/561 X
   4,021,031  5/1977  Meihofer et al. ................. 250/561 X Primary Examiner—Lawrence J. Dahl
Attorney, Agent, or Firm—Weingarten, Maxham & Schurgin

[57] ABSTRACT

For the lateral guidance of travelling webs, three photoelectric detectors are arranged under one margin of the web in a transverse line such that the path of light from a light source, on the other side of the web plane, to a first of the detectors is blocked by the web, the light path to a second of the detectors is partially blocked by the web, and the third detector is fully exposed to the light source, when the web is in its normal lateral position. Signals from the three detectors are combined in such a manner that a signal is derived representing the extent to which the second detector is covered by the web, the value obtained being corrected for variations in light source intensity and for web translucence.

7 Claims, 1 Drawing Figure

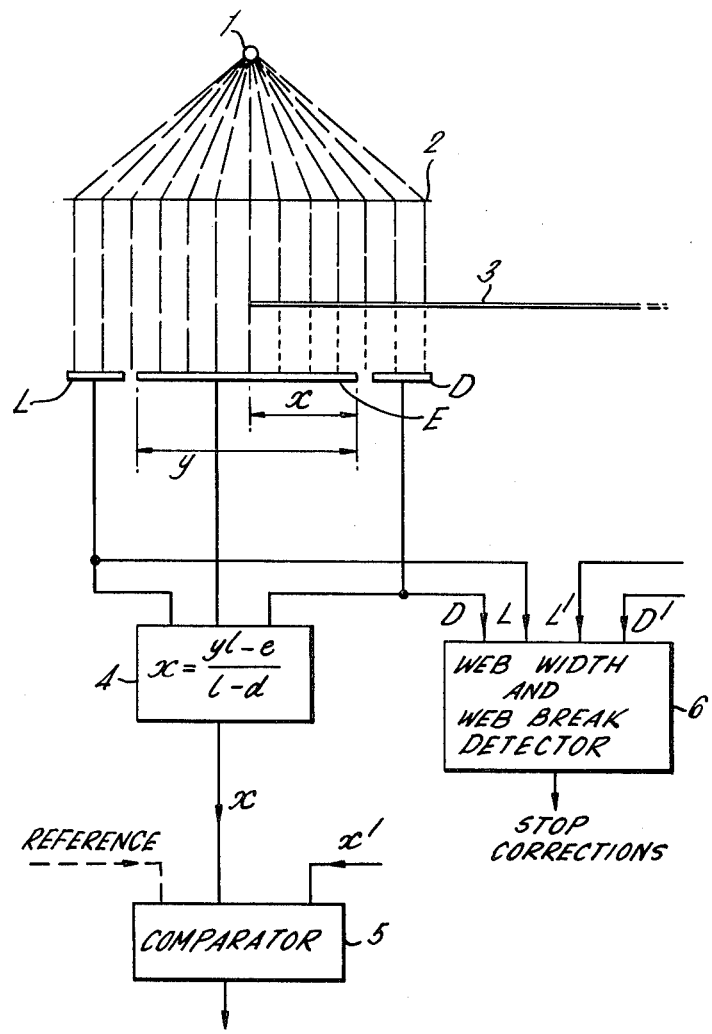

DETECTING LATERAL POSITION OF WEBS

This invention relates to means for measuring the lateral position of a web travelling along a predetermined path and also to the automatic guiding of a web in the direction in the plane of the web and perpendicular to the direction of movement of the web.

In one known apparatus for measuring lateral position of webs, a moving light beam sweeps into and out of the path of the web edge and the light is received by a light-sensitive detector except when obscured by the web; in each sweep of the beam there is a period of obscuration which indicates by its length the lateral position of the web and this is reflected in the corresponding electric signal from the photoelectric device.

In another known system for the lateral center-line guidance of webs, there is a light source above each web edge and a photoelectric device below each web edge, the photoelectric devices receiving an amount of light which depends on the lateral position of the web. The signals from the two photoelectric devices are compared and the web is adjusted laterally until equality of signals is achieved.

A difficulty with this last system is that if the light output of one lamp relative to the other, for example by differential ageing, the automatic guidance system will set the web in a different lateral position.

Apparatus according to the present invention for measuring the lateral position of a web as the web is fed along a predetermined path comprises a position-detecting means located at a margin of the said web path and including a single light source on one side of the web plane and further including on the other side of the web plane an innermost photoelectric detector positioned so that when the lateral position of the edge of the web is within a predetermined range of adjustment the path from the light source to the innermost detector is interrupted by the web, a central photoelectric detector positioned so that when the web edge is within the said predetermined range of adjustment the path from the light source to the central detector is partly interrupted by the web, and an outermost photoelectric detector positioned so that when the web edge is within the said predetermined range of adjustment the path from the light source to the outermost detector is uninterrupted, the apparatus further comprising means jointly responsive to the detector signals to provide an output signal representing the lateral position of the web corrected in accordance with the outputs of the outermost and innermost detectors for light intensity variations and for web translucence, respectively.

In the preferred form of apparatus embodying the invention, the means responsive to the detector signals calculates the lateral position of the web in accordance with a formula involving the length of the central detector, in the transverse direction of the web, the output signal from the central detector, the signal from the outermost detector, and the signal from the innermost detector, the result being a value which represents the position of the web edge along the central detector in the transverse direction of the web.

The signal which is obtained can be used directly to control the lateral position of a web passing through a web-feeding equipment. However, in the preferred form of apparatus embodying the invention such a position-detecting means is used at each margin of the web. By comparing the two signals, the lateral positioning of the web may be controlled from its centre line and as the measurements are corrected for source intensity, differential ageing of the light sources will have no effect. Alternatively, by using one or other of the position-detecting means the lateral position of the web may be controlled from its left-hand edge or its right-hand edge.

In addition, using the signals from the innermost and outermost detectors at each margin of the web, it is possible to prevent corrections when a portion has been torn out of the web on one side and when no web is present due to a web break or due to the end of the web having been reached. The method of achieving this will be described later.

In order that the invention may be better understood, one example of apparatus embodying the invention will now be described with reference to the accompanying drawing, which illustrates the apparatus in diagrammatic form.

In the drawing, the light rays from a light source 1 fall upon a lens system at the plane 2 from which the light emerges as a parallel beam. The lens system may comprise a Fresnel lens.

In its correct position, the web 3 extends halfway through the beam of light, as indicated in the drawing. The line of detectors L, E and D is arranged immediately below the lens system. As a consequence, with the web correctly positioned as shown, it lies between the detector D and the light source and also between the right-hand section of the detector E and the light source. Any light received by the detector D or the right-hand section of the detector E has to pass through the web. The left-hand section of the detector E and the detector L are directly illuminated by the light source. To calculate the lateral position of the edge of the web, assuming equal light sensitivity of the cells, let $d$ be the signal per unit length of cell D, $l$ be the signal per unit length of cell L, $e$ the signal from cell E, and $y$ the length of cell E, these lengths being transverse to the web length.

The total signal from cell E is made up of the signal due to the length $x$ under the web and the signal due to the length $(y-x)$ which is directly illuminated. Any light falling on the length $x$ of the central detector has the same intensity as light falling on detector D. Light falling on the remainder of detector E has the same intensity as that falling on detector L.

Consequently, the signal $e$ from detector E is equal to the product of $d$ and $x$, plus the product of $l$ and $(y-x)$; that is to say, $$e = xd + (y-x)l$$

and therefore $$x = (yl-e)/(l-d)$$

Thus this expression gives the length of the obscured portion of the detector E. The value of $x$ is computed in the calculator unit 4, which is a calculator chip of known kind for obtaining a signal representing the product of the constant $y$ and $l$, the subtractions, and the division of the numerator by the denominator.

The measured position of the web edge is clearly independent of light intensity, sheet translucency and the distance of the sheet from the cells. Since the measurement is corrected for light intensity, where two such systems are used at opposite margins of the web, differential ageing of the light sources and different amounts of dust on the light sources do not lead to error.

In the drawing the signal $x$ and a signal $x'$ from the detector at the other margin are applied to a comparator 5. The difference in the lengths of the obscured portions of the two central detectors, represented by $x$ and $x'$, is used to control the lateral guidance of the web from its centre line. Where a position detecting means is located at only one of the web margins, the comparator receives the signal $x$ and a reference signal, as shown in dotted lines in the drawing. At the same time, the gain of the circuit is altered, as for lateral guidance from the centre line the adjustment required is one half of the difference of $x$ and $x'$.

The output of the comparator, representing the lateral error, is used to control a device for laterally shifting the web in a direction such as to reduce the error. Web shifting devices for this purpose are well-known and will not be described in this specification.

Finally, in the preferred form of apparatus embodying the invention, the signals from the L and D detectors are utilised to ensure that there is a web of the correct width in position, and that the two detector systems are in the correct lateral positions. This is accomplished by making the signal from a fully illuminated detector represent logic 1, so that this logic value is achieved when there is no web shadowing the detector. In the presence of a web, the resulting low signal from the detector is considered as a logic 0. The following table then indicates the condition represented by various combinations of logic signals and the action to be taken.

| Left head | | Right head | | | |
|---|---|---|---|---|---|
| 'L' cell | 'D' cell | 'D' cell | 'L' cell | Condition | Action |
| 1 | 0 | 0 | 1 | All systems correct | Normal |
| 1 | 1 | 0 | 0 | Web right | Move web left |
| 0 | 0 | 1 | 1 | Web left | Move web right |
| 1 | 0 | 1 | 1 | Web width incorrect | Stop corrections |
| 1 | 1 | 0 | 1 | Web width incorrect | Stop corrections |
| 1 | 1 | 1 | 1 | No web present | Stop corrections |

The combinations of ones and zeros are detected in a simple logic circuit of conventional design, represented by the block 6.

The set of signals in the fourth and fifth lines of the table indicate that the web width is incorrect; this may be due to a marginal portion of the web having been torn away. In such a case it is undesirable to make corrections because the signals obtained would indicate, incorrectly, that the web had to be moved laterally to shift the torn portion towards the normal lateral position for the web. Consequently corrections are stopped until the outputs from the four L and D cells no longer show three values of 1.

Similarly, when all four L and D cells have the logic value 1 it is generally indicative of an absence of web and again corrections should be stopped in order to avoid an offset when the next web is threaded through.

Preferably, the three detectors are part of a single detector which has been split into three after manufacture, in order to ensure a uniform response from each of the detector sections.

I claim:

1. Apparatus for measuring the lateral position of a web as the web is fed along a predetermined path, comprising:
    a position-detecting means located at a margin of the said web path and including a single light source on one side of the web plane and further including on the other side of the web plane
    an innermost photoelectric detector positioned so that when the lateral position of the edge of the web is within a predetermined range of adjustment the path from the light source to the innermost detector is interrupted by the web,
    a central photoelectric detector positioned so that when the web edge is within the said predetermined range of adjustment the path from the light source to the central detector is partly interrupted by the web,
    and an outermost photoelectric detector positioned so that when the web edge is within the said predetermined range of adjustment the path from the light source to the outermost detector is uninterrupted;
    and means jointly responsive to the detector signals to provide an output signal representing the lateral position of the web corrected in accordance with the outputs of the outermost and innermost detectors for light source intensity variations and for web translucence, respectively.

2. Apparatus in accordance with claim 1, in which the means responsive to the detector signals calculates the lateral position of the web in accordance with the formula $$x = (yl-e)/(l-d)$$

where $x$ is the length, in the transverse direction of the web, of the part of the central detector obscured by the web, $y$ is the total length of the central detector, $e$ is the output of the central detector, $l$ is the signal per unit length of the outermost detector, and $d$ is the signal per unit length of the innermost detector.

3. Apparatus in accordance with claim 1 comprising a comparator circuit connected to receive the said output signal and a reference signal and to generate an error signal.

4. Apparatus in accordance with claim 1, in which the length of the central detector, in the transverse direction of the web, is greater than that of either the innermost or the outermost detector.

5. Apparatus in accordance with claim 1,
    further comprising a circuit responsive to the obscuration of both the innermost and outermost detectors to generate a "stop correction" signal.

6. Web feeding equipment comprising apparatus in accordance with claim 3 in combination with means for laterally guiding the web in response to the error signal in a direction such as to reduce the error signal.

7. Web feeding equipment including apparatus in accordance with claim 1, at each side of the web path, a comparator comparing the error signals from the said two apparatus, and means for laterally guiding the web in response to the comparator output in a direction such as to reduce the said comparator output.

* * * * *